United States Patent Office 3,299,247
Patented Jan. 17, 1967

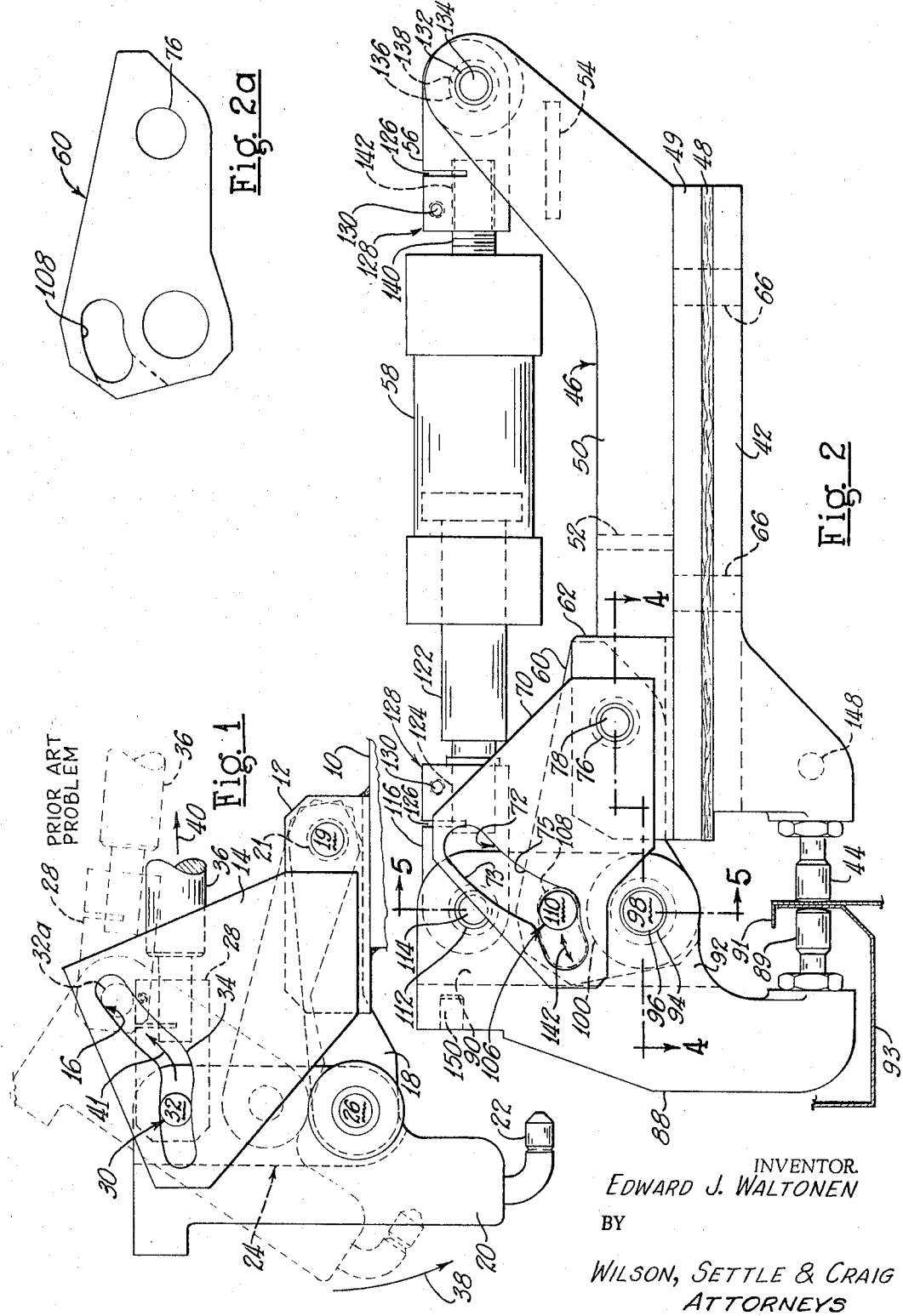

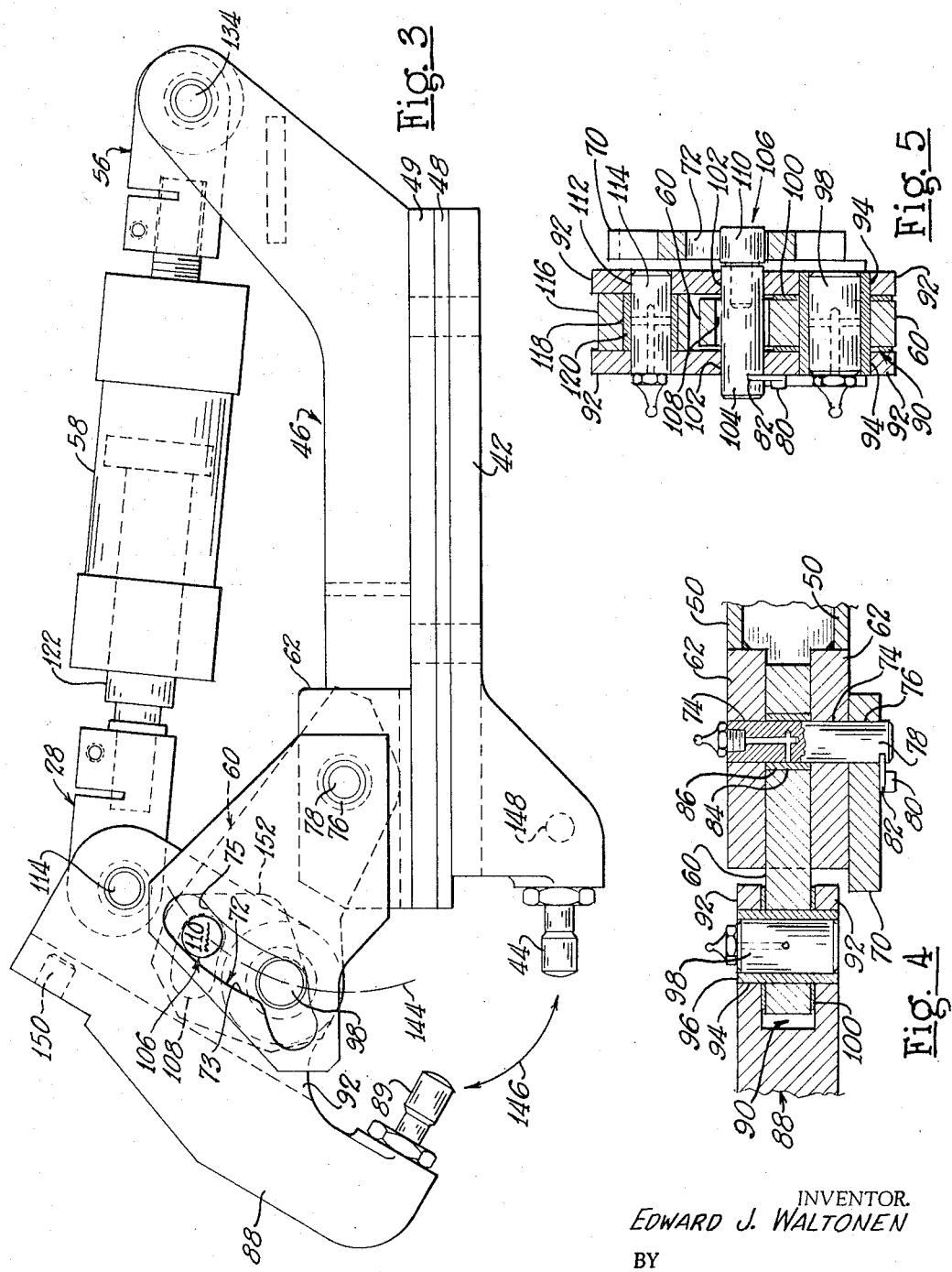

3,299,247
FORCE APPLYING DEVICES HAVING DUAL
GUIDE STRUCTURES
Edward J. Waltonen, Southfield, Mich., assignor to Wes Industries, Inc., Royal Oak, Mich., a corporation of Michigan
Filed Nov. 15, 1963, Ser. No. 324,014
16 Claims. (Cl. 219—89)

This invention relates to force-applying devices of the type employed as welding guns, riveters, punches, piercers, and the like, wherein two opposed, work-contacting members are powered into opposing engagement with a workpiece(s) therebetween to perform an operation thereon. More particularly, this invention relates to opposed electrode welding guns of the type adapted to embrace and grip a workpiece. Thus, by action of one of the jaws cocking open, the gun can be advanced into, or reach over, the work for the weld; and then be withdrawn. This permits complex workpieces to be positioned on and then removed from a holding jig. The extension of the invention to other pressure applications such as riveters and the like will become apparent as the description progresses.

THE PROBLEM OF THE PRIOR ART

Welding guns of the opposed electrode, resistance-type have achieved great application in both American and foreign industry. This has been particularly true in the fastening art such as the joinder of automobile sheet metal panels and the like. These guns are of several varieties, as follows:

(1) The fixed type wherein the unit is fastened to a base and where the work is brought to the gap between the electrodes for application of heat and pressure to complete the weld. In this type of gun, the electrodes travel only toward and away from one another in a linear, reciprocating fashion. These are the old granddads of the business.

(2) As the art progressed, it became evident that larger and bulkier pieces were too complicated to be simply fed to the gap between the electrodes by hand. Further, these more complex pieces required very accurate positioning and alignment which could not be accomplished by hand. Thus, a jig was required. It accordingly became evident that the gun would have to come to the work. Therefore, guns of the self-equalizing type were developed. In these units, the gun floated on a reciprocating carriage. In operation, a cylinder moved the rear electrode into contact with the work and then the cylinder floated to bring the forward electrode into the work. Thus, no pressure of a distorting nature was imposed, as would be the case if one of the electrodes was fixed and the work not exactly against it when the other electrode "homed." Thus, this construction equalized the electrodes before welding pressure was applied and brought them both up gently into final gripping contact or engagement with the work, after which the weld heat was applied to complete the weld. This type of gun has been very successful, one being that disclosed in my copending application, Serial No. 110,797, filed May 17, 1961, now U.S. Patent No. 3,136,879.

(3) As the art of fabricating metals continued to develop and grow more complex, it became desirable to join parts that were of a curvature that would not fit into a simple linear electrode gap. Although the reciprocating electrode type is very satisfactory for a lot of work where the two parts are joined by a lip, or by placement of a lip of each of the parts together to produce a "seam" when the weld is completed, it does not fulfill all of the requirements of metal joinder that would have been developed. These include the more complex parts of automobile bodies where the lip has a terminal projection. Accordingly, in order to be joined by machine welding, it is necessary that the electrodes "reach around" or "embrace" or "reach under" the parts to find the weld point. As evidence of the fact that the art does and has continued to progress, it can be stated that such "reach-type" guns have been developed. In the designs utilized heretofore, there have, however, been serious problems. In order to make the outer electrode reach or embrace a workpiece, the prior guns have relied upon a McGill cam follower operating in a cam track or slot. By suitable interconnections, as the cam follower moved back and forth in the slot, it forced the outer electrode both to move in, as well as cock back out of the way, for operation of the gun. The probelm has arisen precisely at this point. Thus, on the return stroke, the cam follower rides the back side of the track. The McGill follower comprises a ball bearing roller at the end of a stud body. Obviously, with a stud of ¾" diameter, only about ½" roller stud can be used in order to have reasonable strength of connection between the parts. This is a fairly rugged piece of metal. However, it will be evident that it can absorb only so much side thrust. Larger units can, of course, be made; but in order to provide compact units, there are automatically imposed limitations on the maximum diameter of the follower. A ¾" body McGill follower is sufficiently strong to absorb the forces encountered in moving the outer electrode down the cam track and into position. Here, the force of gravity and the slope of the cam are gentle and work together to assist the follower. However, in retracting the outer electrode, the follower must move past the sharp break of the cam track on the way up and then up the fairly steep slope. On the return stroke the follower also has to work against the force of gravity and lift the electrode and associated arms and linkages, comprising a substantial mass, and all of this while encountering the sharp bump of the cam track. Breaking of the roller end off the follower has plagued this gun.

Therefore, a substantial advance to the art would be provided by a welding gun of the cam-actuated type embodying mechanism to protect the cam follower against stress and breaking on the return stroke, by relieving all forces on the follower roller on the return stroke. The advance to the art would be substantial if all of this were accomplished without adding complexity and weight to the construction. Thus, the art would be benefited by a smoothly operating, efficient, long-lived and durable construction of reach-around type welding gun.

It is, therefore, an important object to provide a novel welding gun of the embracing type, characterized by simplicity of construction and ease of manufacture, and embodying improved durability by incorporating a novel, loose link actuating mechanism operating in combination with the body of the cam follower for the opening movement.

A further object is to provide a cam-type embraceable welding gun wherein a loose link absorbs impact forces on the return stroke of the gun, thus relieving the cam follower roller of any force during the return stroke.

A still further object is to provide an improved welding gun of the cam-actuated, embracing type characterized by improved smoothness of operation, along with economy of manufacture and greatly extended durability.

Other objects of this invention will appear in the following description and appended claims, reference being had to the accompanying drawings forming a part of this specification wherein like reference characters designate corresponding parts in the several views.

In the drawings:

FIG. 1 is a fragmentary, side elevational view of a cam-actuated welding gun typifying the problem of the prior art; to wit, cam follower breakage;

FIG. 2 is a side elevational view of the gun of the present invention, with the electrodes in the weld position;

FIG. 2a is a side elevational view of the loose link employed in the gun of FIG. 2, also illustrating an optional design of loose link by the dotted outline;

FIG. 3 is a side elevational view similar to FIG. 2, but with the electrodes in open position;

FIG. 4 is a sectional view taken along line 4—4 of FIG. 2; and

FIG. 5 is a sectional view taken along line 5—5 of FIG. 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

PERSPECTIVE VIEW

By the present invention, there is provided a welding gun wherein the closing of the electrodes relative to one another is effected through the roller of a cam follower following a cam track. However, on the return stroke, the roller is not used at all; instead, the body of the follower absorbs the forces, working in combination with a novel loose link. This combination is effective to cock back the head carrying the outer or movable electrode without any stress at all being placed on the cam roller. Thus, the cam follower is prevented or guarded against being broken and thus the durability of the unit is substantially enhanced over those of the prior art, wherein the problem enumerated above has been encountered.

THE PRIOR ART TYPIFIED

By reference to FIG. 1, we observe a fragmentary portion of a welding gun of the cam-actuated type. This figure illustrates only the movement of the outer electrode between solid, welding position; and dotted outline, retracted position. Thus, the gun includes a frame 10 that carries a fixed electrode, not shown, but similar to that of the gun of invention 44 shown in FIG. 2. At the forward end, the frame 10 carries a pair of spaced, parallel and vertically extending pivot plates 12. Extending upwardly from one plate is a cam plate 14 with a cam track 16 in the upper part thereof.

Embraced between the spaced pivot plates 12 is a pivot arm 18 that during operation of the gun is moved between the solid line closed position and the dotted line open position. This arm 18 is mounted at its rear end for pivotal movement by means of a transverse pivot pin 19, carried by aligned apertures of plates 12. A bushing 21 surrounds pin 19 and is carried within an aperture of arm 18 to receive the pin 19.

The front electrode carrier 20 has the front electrode 22 fastened to its bottom end. This unit is of substantial thickness and has a slot 24 removed as indicated by the dotted line which the lead arrow of the reference numeral 24 touches.

At the bottom, a pivot pin 26 is extended between the remaining side portions of front electrode carrier 20 on each side of slot 24. Pin 26 also extends through the forward end of the pivot arm 18 to provide a pivot connection between the elements 18 and 20. At the top end, a clevis 28, of generally flat configuration at its forward end, extends into the recess 24. A McGill cam follower 30 has the stud or body portion thereof extended through the clevis and through the side portions of body 20 with the roller head 32 in the cam slot 16 of plate 14.

The back end of the clevis 28 is adapted to receive the end of a piston rod 36 of a cylinder, not shown, for actuation of the unit. It will be noted that on the forward push of the piston rod 36, as starting from the dotted outline, the roller head 32 is moved from position 32a, downwardly, and stops at the solid line position. This also causes the front electrode to move from the dotted line, retracted position, down to the solid line or closed position. The roller 32 moves down the cam track 16 easily and then forward in the cam slot without side thrust. This causes body 20 to roll easily downwardly in the arrow direction 38.

On reverse movement, however, it will be observed that reverse movement of piston rod 36 in the arrow direction 40 is not so easy. Thus, the roller head 32 of follower 30 must "bump" the sharp bend 34 in the cam track 16 and then ride up the back side in the arrow direction 41. This is precisely the point of failure alluded to above for these prior mechanisms. The roller 32 just cannot stand the side thrust imposed by slamming into the upwardly slanting portion of track 16 and also carry with it the weight of the head 20, electrode and pivot arm 18.

By the present invention, this condition is effectively alleviated by a novel configuration of parts, permitting easy cam tracking on the way down; but not utilizing the cam track on return, thus taking away thrust completely from the roller on the return.

THE INVENTION

Referring to FIG. 2, it will be noted that the apparatus of the present invention comprises a lower base member 42. At the forward end, base 42 carries fixed electrode 44. The base member for the mechanism carrying the movable electrode is designated 46 and is separated from base member 42 by an insulating layer 48.

Base member 46, for the forward, movable electrode, includes a base plate 49. A pair of spaced side plates 50 are welded in vertical parallel alignment to the top side of plate 49. These are separated at their forward ends by a transverse spacer 52 and at the rear by a rear, transverse spacer 54. The spaced side plates 50 are also shown in FIG. 4.

The purpose of the spacing at the rear is to embrace a clevis 56 by which the back end of cylinder 58 is mounted. At the front end the spacing is for the purpose of supporting a lose link 60, as will become evident. At this moment, it might be pointed out that loose link 60 is also shown in FIG. 2a in side elevational view.

At the front end, as indicated in FIGS. 2 and 4, pivot plates 62 are welded to extend forwardly from side plates 50 and also welded to base 49. At this time, it might be stated that the entire unit is fastened to a suitable base, not shown, by passing insulated bolts through the bolt holes 66.

To the left side pivot plate 62, as shown in FIGS. 2 and 4, there is welded a cam plate 70. This has cam track 72 at its upper end. The pivot plates 62 and cam plate 70 are apertured at 74 and 76 to receive pin 78. This is a slip fit in holes 74 and 76 and is, therefore, secured in position by means of screw 80 and lock dog 82 (FIGURE 4). The loose link 60 is apertured at 84 and bushed with a sleeve bushing 86, receiving the pivot pin 78.

THE FRONT ELECTRODE CARRIER MEMBER

This is represented by numeral 88 and is of substantial thickness, with a slot 90 hollowed out on the back side to receive the front end of loose link 60. As shown in both FIGS. 4 and 5, the side portions 92 of the body of carrier 88 are each apertured at 94 to receive an oilite bushing 96 into which is fitted a pivot pin 98. Spacer washers 100 are used to provide freedom of movement of the parts relative to one another.

THE INTERRELATIONSHIP OF THE LOOSE LINK AND THE McGILL CAM FOLLOWER

As shown in FIG. 5, the two sides 92 of the front electrode carrier 88 are apertured at 102 to receive the stud body 104 of the McGill follower 106. This is locked in place by a screw 80 and lock dog 82. It will thus be noted that the cam follower 106 and the sides 92 are locked together relative to one another. However, there is provision for movement between central portion of the body of the cam follower and the loose link 60. Thus, loose link 60 is provided with a closed end slot 108, or optionally open-ended as shown by the dotted line break-away of FIG. 2a. The width of closed end slot 108 is slightly greater than the diameter of body 104 of cam follower 106. At the back side, however, the radius of operation of the closed end slot is slightly greater than the back radius 75 of the cam track 72. By so operating, on the return or opening stroke, the body of the cam follower will bottom on the back side of the closed end slot 108 of loose link 60 and keep the roller end 110, which is the weakest part of the follower, from slamming into the back side 75 of the track 72. This is the precise point at which the fracture previously plaguing the prior guns of this type has been solved in accordance with the present invention.

For all practical purposes, the back side of the cam track from the sharp break on up could be cut back even more since it is never engaged by the roller end. This is suggested by the dotted line 152 of FIG. 3. It will be noted that there is clearance between the sides of loose link 60 and the inner sides of the side portions 92. This is established by spacer washers 100 previously referred to in FIG. 5.

Operation of the unit will be more fully described later as regards the roller end portion 110 of the cam follower 106 following the front side 73 of cam track 72 on the down or closing stroke, but engaging the loose link 60, and not the cam track, on the return or opening stroke. This keeps roller 110 away from the back side 75 of the track, and the loose link takes the thrust as a stiff or rigid member in combination with the body 104 of the follower on the return stroke.

THE FRONT CLEVIS AND OPERABLE INTERCONNECTION WITH THE CYLINDER

As best shown in FIG. 5, sides 92 of hollowed-out portion 90 of front electrode carrier 88 are each apertured at 112 to receive a pivot pin 114. This is locked in position by a screw or the screw-lock dog combination previously pointed out. A clevis 116 is apertured at 118 and fitted with an oilite bushing 120, including an appropriate grease fitting as indicated. Some clearance is provided between these parts and, thus, spacer washers are not necessary because clevis 116 is free to rotate with piston rod 122. At the back end, the clevis 116 is provided with an aperture 124 to receive the forward end of piston rod 122. Transverse vertical cut 126 and an axially extending cut indicated by arrow 128 permit a bolt 130 to be tightened and cause the rear end of clevis 116 to grip the front end of piston rod 122. A similar arrangement is provided at the back end of cylinder 58, arms 50 being apertured at 132 to receive pivot pin 134. The back end of clevis 56 is also apertured at 136 to receive bushing 138 for rotation on pin 134. A threaded stud projection 140 extends axially from the rear end of cylinder 58 into a threaded aperture 142 of clevis 56. By means of transverse slot 126, axial slot 128, and bolt 130, the units are locked together.

A grease fitting can be applied in the nature of that shown at the top of FIG. 5, representing the arrangement used on the pivot of the front clevis 116.

OPERATION

In FIG. 2, piston rod 122 has been moved forwardly from the FIG. 3 position, and this has caused the roller end 110 of the McGill follower 106 to ride along the front side 73 of track 72 to move the head from the open position of FIG. 3 to the closed position of FIG. 2. Although in FIG. 2, the roller end 110 of the cam follower has not been indicated as utilizing the forward portion of the closed end slot 108, it is to be understood that it is free to do so. The reason it hasn't is that the electrodes 44 and 89 have the workpieces 91 and 93 gripped therebetween in the weld position. However, it can be visualized that if front electrode is a little shorter and the workpieces a little thinner, the roller end 110 will move forward in the double-headed arrow direction 142.

The reason for this discussion at this time is to show that loose link 60 operates as such on the forward stroke of the piston rod, being effective only as a pivot at the bottom, on pivot pin 98. It is, however, without other interconnection in order to permit the cam track 72 to absolutely establish and control the rocking motion of head 88 on the closing movement or stroke of the front electrode 89.

THE RETURN STROKE

Referring first to FIG. 2, let us visualize that the piston rod 122 is being retracted. It will be noted that just after retracting movement begins, the body portion 104 of follower 106 will bottom on the back end of closed slot 108. This will lock the loose link 60 and the front electrode carrier 88 together and keep the roller end 110 off the back side 75 of track 72. Further movement of the piston rod 122 in a retracting direction will simply cock the whole unit back to the position indicated in FIG. 3. This makes the entire unit pivot through an arc 144 while the roller end 110 is maintained off the back side 75 of track 72, as clearly shown in FIG. 3.

The manner in which the front electrode 89 is cocked to and from welding position to clear the lip of workpiece 91 is evident from the dipping arrow 146 of FIG. 3.

EXTENDED SCOPE OF INVENTION

FIG. 2a represents a logical extension of the invention wherein the stronger, more preferred loose link is shown by solid line. Here the slot 108 is of closed end construction. However, this piece can be reduced in weight by cutting off the front end along the dotted line for lighter duty units.

Further, it is to be understood that the gun of invention can be mounted upon a self-equalizing carriage of the type disclosed in my copending application referred to above. Thus, the self-equalizing features and advantages as set forth in that application can be utilized in addition to the unique anti-fracture construction disclosed herein.

It will be evident to one skilled in the art that shunt connections 148 and 150 make the present unit into a welding gun. However, the extended scope of invention would apply the principle involved for riveting, punching, piercing, and other analogous pressure applications, as well as the welding operation utilizing both pressure and electric current for heat as disclosed more particularly herein.

The cam path is to be understood as exemplary; the principle of the invention is to be construed as applicable to curves of other configuration as long as the sharp break on the back stroke is not encountered by the roller end of the follower.

It will be noted for practical purposes that the rear portion 75 of the cam track 72 is inoperable. Therefore, this can be omitted or simply relieved, as by the dotted outline 152 of FIG. 3. Thus, no careful machining is required along the back, reducing the costs of manufacture.

ADVANTAGES OF THE INVENTION

The advantages inherent in this invention are believed to be self-evident from the foregoing disclosure. However, these will be highlighted briefly as follows in order to clearly show the manner in which the invention is distinguished from the prior art and further the contribution made to the art:

(1) A simplified construction wherein the utility of a cam slot is clearly inherent, but wherein breakage ordinarily and previously encountered by a cam follower has been eliminated.

(2) A unit that operates freely and yet has long life by built-in durability, but without excess complications and restrictions preventing freedom of movement.

(3) Application with the self-equalizing principle disclosed in my prior application referred to above, in order to provide additional flexibility of operation and usefulness.

(4) A cam-operated unit having substantial versatility of direction and path of movement of an electrode into a tight place for application of welding pressure as exemplified in FIG. 2 and as exemplified by the arrow 146 of FIG. 3 of the drawings.

What is claimed is:

1. In a force-applying device,
a base carrying a first pressure-applying member at one end,
a link member having front and rear ends with the rear end pivotally mounted to said one end of said base,
a carrier for a second pressure-applying work member pivoted to said front end of said link member,
a second pressure-applying member on said carrier for movement into opposed relation with said first pressure-applying member,
a cam track carried by said base,
a cam follower having a body carried by said carrier and an extending roller end,
said roller engaging said cam track in one direction of movement only,
said follower engaging said link on opposite direction of movement only,
and means to move said body in first one direction and then the opposite.

2. In a force-applying device,
a base,
a first pressure-applying member connected to said base,
a link member pivotally mounted to said base at one point,
a carrier for a second pressure-applying work member pivoted to said link member at a second point,
a second pressure-applying member connected to said carrier for arcuate movement into opposed, pressure-applying relation to said first pressure-applying member,
cam track means,
means supporting said cam track means at a position spaced from said base,
cam follower means having a body connected to said carrier and a roller engaging said cam track means to move said carrier on application of movement force to said carrier in one direction,
said body engaging said link to lock said link and body together on application of force to said carrier in an opposite direction,
and means for applying moving force to said carrier in first one direction and then the other.

3. In a force-applying device,
a base carrying a first pressure-applying work member at one end,
a link member having front and rear ends with the rear end pivotally mounted to said one end of said base,
a carrier for a second pressure-applying work member pivoted to said front end of said link member,
a second pressure-applying member on said carrier for movement into opposed relation to said first pressure-applying work member,
a cam track carried by said base,
a cam follower having a body carried by said carrier and an extending roller end,
said roller end only engaging said cam track in one direction of movement of said carrier,
said follower body only engaging said link on opposite direction of movement of said carrier,
and means to move said carrier in first one direction and then the opposite.

4. In a force-applying device,
a base,
a first work member connected to said base,
a link member pivotally mounted to said base at one point on said link member,
a carrier for a second work member pivoted to said link member at a second point on said link member,
a second work member connected to said carrier for arcuate movement into opposed relation to said first work member,
cam track means,
means supporting said cam track means at a position spaced from said base,
cam follower means having a body connected to said carrier and a roller engaging said cam track means to move said carrier on application of force to said carrier for movement in one direction,
said body engaging said link to lock said link and carrier together on application of force to said carrier for movement in an opposite direction,
and means for applying moving force to said carrier for movement in first one direction and then the other.

5. In a welding gun,
a base having a first electrode attached thereto,
a link member pivoted to said base,
a carrier pivoted to said link member,
a second electrode attached to said carrier for movement into opposed relation to said first electrode,
cam track means,
means supporting said cam track means at a position spaced from said base,
cam follower means on said carrier and engaging said cam track means to control movement of said carrier in one direction,
abutment means on said carrier and engaging said link member on movement of said carrier in a reverse direction,
means for moving said carrier in said one direction and then in said reverse direction,
means electrically isolating said electrodes from one another,
and means for feeding electric current to said electrodes.

6. In combination,
support means having first work member means attached thereto,
link member means pivotally mounted to said support means,
carrier means pivotally mounted to said link member means,
second work member means attached to said carrier means for movement into opposed relation to said first work member means,
cam surface means,
support means for said cam surface means,
cam follower means connected to said carrier means and engaging said cam surface means to control movement of said carrier means in one direction,
abutment means on said carrier means engaging said link member means on reverse movement of said carrier means to cause said carrier means and link means to move as a unit, and means for moving said carrier means in said one direction and then in said reverse direction.

7. In a cam-actuated welding gun,
support means having first electrode means connected thereto,
link member means pivotally mounted to said support means,
second electrode carrier means pivotally mounted to said link member means,
second electrode means connected to said carrier means for movement into opposing relation to said first electrode means,
means electrically insulating said electrode means from one another,
cam track means attached to said support means,
cam follower means attached to said carrier means and engaging said cam track means on movement of said carrier means in one direction,
abutment means on said carrier means and engaging said link member means to lock said carrier means and said link means together for pivotal movement as a unit on reverse movement of said carrier means,
reciprocating fluid power means connected to said carrier means,
means for reciprocating said fluid power means to move said carrier means in said one direction and then in said reverse direction,
and means for feeding electric current to said electrode means.

8. In work mechanism,
support means having first work member means thereon,
link member means pivotally mounted to said support means,
carrier means pivotally mounted to said link member means,
second work member means attached to said carrier means for movement into opposed relation to said first work member means,
cam track means attached to said support means,
cam follower means having a body carried by said carrier means, and a follower head extending beyond said carrier means to engage said cam track means on movement of said carrier means in one direction,
said cam follower body engaging said link member means to lock said carrier and link member means together for movement as a unit on reverse movement of said carrier means,
hydraulic cylinder means connected to said support means and to said carrier means to move said carrier means first in said one direction and then reverse,
and means for powering said cylinder means.

9. In a cam-actuated apparatus,
support means having first work member means thereon,
link means movably connected to said support means,
said link means including abutment means,
carrier means movably connected to said link means,
second work member means attached to said carrier means for movement into opposed relation to said first work member means,
cam track means attached to said support means,
cam follower means having a body carried by said carrier means, and a roller head,
said roller head engaging said cam track means on movement of said carrier means in one direction,
said cam follower body engaging said abutment means of said link means to lock said carrier and link means together for movement as a unit on reversal of said carrier means,
hydraulic cylinder means having one end connected to said support means and the other end connected to said carrier means to move said carrier means first in said one direction and then reverse,
and means for powering said hydraulic cylinder means.

10. In a cam-actuated welding gun,
a base having a first electrode connected thereto,
a link pivotally connected to said base,
said link including an abutment,
a carrier pivotally connected to said link,
a second electrode attached to said carrier for movement into opposed relation to said first electrode,
a cam track supported on said base,
a cam follower having a body connected to said carrier, and a follower head,
said follower head engaging said cam track to control movement of said carrier in one direction,
said follower body engaging said link abutment to control movement of said carrier in reverse direction,
hydraulic cylinder means having one end connected to said support means and the other end connected to said carrier means to move said carrier means first in said one direction and then reverse,
means for powering said hydraulic cylinder means,
means electrically isolating said electrodes from one another,
and means for feeding electric current to said electrodes.

11. In work apparatus,
support means,
first work member means connected to said support means,
link means movably connected to said support means,
said link means including abutment means,
carrier means movably connected to said link means,
second work member means connected to said carrier means for movement into opposed relation to said first work member means,
abutment means on said carrier means,
guide means,
support means for said guide means,
follower means connected to said carrier means and engaging said guide means to control movement of said carrier means in one direction,
said carirer abutment means engaging said link abutment means to control reverse movement of said carrier means,
and means for moving said carrier in one and reverse directions.

12. In work apparatus,
support means,
first work member means connected to said support means,
link means movably connected to said support means,
said link means including abutment means,
carrier means movably connected to said link means,
second work member means connected to said carrier means for movement into opposed relation to said first work member means,
abutment means on said carrier means engageable with said link abutment means,
guide means,
support means for said guide means,
follower means connected to said carrier means,
means for moving said follower means into engagement with said guide means; and said carrier abutment means out of engagement with said link abutment means on movement of said carrier means in one direction,
means for moving said follower means out of engagement with said guide means; and said carrier abutment means into engagement with said link abutment means on movement of said carrier means in reverse direction,
and means for moving said carrier means in one and reverse directions.

13. In a base-supported, force-applying fabricating device having means carrying a workpiece fabricating means, which carrying means and fabricating means are mounted for curvilinear movement between retracted and working positions, the improvement comprising abutment means mounted upon said carrying means and first and second guide means interposed between said carrying means and said base, said first guide means being pivotably interconnected to said base and engageable with a first, non-rotatable part of said abutment means so that said abutment means and said first guide means move in substantial unison during at least part of the movement of said fabricating means away from the working position, and said second guide means being rigidly interconnected to said base and engageable with a second, rotatable part of said abutment means so that the abutment means moves relative to said second guide means during at least part of the movement of said fabricating means toward said working position.

14. In a base-supported, force-applying fabricating device having means carrying a workpiece fabricating means which carrying means and fabricating means are mounted for curvilinear movement between retracted and working positions, the improvement comprising abutment means mounted upon said carrying means including rotatable and non-rotatable parts and first and second guide means interposed between said carrying means and said base for selective engagement with said abutment means to guide said fabricating means between the retracted and working positions, said first guide means being connected to said base for movement relative thereto and being engageable with said non-rotatable part of said abutment means to guide said fabricating means during at least part of the movement of said fabricating means away from said working position, and said second guide means being rigidly connected to said base and engageable with said rotatable part of said abutment means to guide said fabricating means during at least part of the movement of said fabricating means toward said working position.

15. In a base-supported, force-applying fabricating device having a tool-carrier which supports a workpiece fabricating tool, which tool-carrier and tool are mounted for curvilinear movement between retracted and working positions, the improvement comprising a cam follower mounted on the tool-carrier, the cam follower having a non-rotatable portion and a roller, a link pivotably interconnected to the base engaging and moving in unison with said non-rotatable portion of the cam follower in force-transmitting relation during at least a portion of the movement of the tool away from the working position, and a member rigidly interconnected to the base and providing a cam track with which the roller rotatably engages so that the cam follower moves in force-transmitting relation relative to the member during at least a portion of the movement of the tool toward the working position.

16. In a base-supported, force-applying fabricating device having means carrying a workpiece fabricating means, which carrying means and fabricating means are mounted for curvilinear movement between retracted and working positions, the improvement comprising abutment means mounted on said carrying means and first and second guide means interposed between said carrying means and said base, said first guide means comprising a link movably connected to said base and engaging a first part of said abutment means to control the pattern of movement of said fabricating means away from the working position, and said second guide means comprising a member rigidly connected to said base and having a cam track engaging a second part of said abutment means to control the pattern of movement of said fabricating means toward said working position.

References Cited by the Examiner

UNITED STATES PATENTS 3,008,032  11/1961  Wolfbauer _____ 219—89
3,008,034  11/1961  Wolfbauer _____ 219—89

JOSEPH V. TRUHE, *Primary Examiner.*